United States Patent
Long et al.

(10) Patent No.: US 11,766,974 B2
(45) Date of Patent: Sep. 26, 2023

(54) QUICK FITTING AND PROTECTION MECHANISM FOR WIRE HARNESS IN SLIDE RAIL

(71) Applicant: Yanfeng Adient Seating Co., Ltd., Shanghai (CN)

(72) Inventors: Yong Long, Shanghai (CN); Jingjing Shi, Shanghai (CN); Qiuwei Zhang, Shanghai (CN); Hui Zhang, Shanghai (CN); Dingyu Wang, Shanghai (CN)

(73) Assignee: Yanfeng Adient Seating Co., Ltd., Shanghai (CN)

( * ) Notice: Subject to any disclaimer, the term of this patent is extended or adjusted under 35 U.S.C. 154(b) by 267 days.

(21) Appl. No.: 17/309,359

(22) PCT Filed: Nov. 29, 2019

(86) PCT No.: PCT/CN2019/121825
§ 371 (c)(1),
(2) Date: May 21, 2021

(87) PCT Pub. No.: WO2020/140659
PCT Pub. Date: Jul. 9, 2020

(65) Prior Publication Data
US 2022/0017027 A1 Jan. 20, 2022

(30) Foreign Application Priority Data
Jan. 2, 2019 (CN) .......................... 201910000469.8

(51) Int. Cl.
*B60R 16/027* (2006.01)
*B60R 16/02* (2006.01)
*B60N 2/07* (2006.01)

(52) U.S. Cl.
CPC ........ *B60R 16/0215* (2013.01); *B60N 2/0722* (2013.01); *B60R 16/027* (2013.01)

(58) Field of Classification Search
CPC .. B60R 16/0215; B60R 16/027; B60N 2/0722
(Continued)

(56) References Cited

U.S. PATENT DOCUMENTS 5,188,329 A * 2/1993 Takahara ............. B60N 2/0725
297/344.1
6,267,430 B1 * 7/2001 Cresseaux ............ B60N 2/0224
296/65.01

(Continued)

*Primary Examiner* — Timothy J Thompson
*Assistant Examiner* — Michael F McAllister
(74) *Attorney, Agent, or Firm* — Wang Law Firm, Inc.

(57) ABSTRACT

A quick fitting and protection mechanism for a wire harness in a slide rail has a drag chain for the wire harness to be threaded through; a drag chain towing support connected to an upper slide rail and slidable in a slideway of a lower slide rail with the upper slide rail, where the drag chain towing support has a drag chain port, a wire harness outlet, and a first channel affording communication between the drag chain port and the wire harness outlet, where one end of the drag chain is connected to the drag chain port; a wire harness guide support having a wire harness entry, a wire harness exit, and a second channel affording communication between the wire harness entry and the wire harness exit, where the wire harness entry is in rotatable communication with the wire harness exit.

10 Claims, 9 Drawing Sheets

(58) Field of Classification Search
USPC .......................................................... 174/72 A
See application file for complete search history.

(56) References Cited

U.S. PATENT DOCUMENTS

| | | | | |
|---|---|---|---|---|
| 9,352,671 | B1* | 5/2016 | Enders | B60N 2/42736 |
| 2007/0084619 | A1* | 4/2007 | Kisu | B60R 16/0215 |
| | | | | 174/72 A |
| 2012/0024561 | A1* | 2/2012 | Sekino | H02G 11/00 |
| | | | | 174/50 |
| 2014/0263921 | A1* | 9/2014 | Dick | B60N 2/0722 |
| | | | | 248/430 |
| 2014/0339376 | A1* | 11/2014 | Katou | B60R 16/027 |
| | | | | 248/49 |
| 2015/0001366 | A1* | 1/2015 | Nakashima | B60N 2/0727 |
| | | | | 248/429 |
| 2015/0210187 | A1* | 7/2015 | Harleb | B60N 2/067 |
| | | | | 248/429 |
| 2016/0186803 | A1* | 6/2016 | Terada | B60N 2/0722 |
| | | | | 384/15 |

\* cited by examiner

QUICK FITTING AND PROTECTION MECHANISM FOR WIRE HARNESS IN SLIDE RAIL

BACKGROUND

Technical Field

The present invention relates to the technical field of wire harness structures in a slide rail, and in particular, to a quick fitting and protection mechanism for a wire harness in a slide rail.

Related Art

At present, a wire harness is directly connected to a seat in most cases. Since a stroke is short, the wire harness is not exposed. However, when the wire harness is relatively long, a path is uncontrollable, especially for MPV/SUV seats, which usually have a long seat stroke. If the wire harness is directly connected to the seat, an appearance is not acceptable, and the wire harness is easily damaged.

In vehicles of some models on the market, the wire harness is connected to the seat within a seat slide rail to ensure that the wire harness is not exposed. However, an upper slide rail needs to be connected to the wire harness before being mounted into a lower rail of a seat, resulting in inconvenient arrangement of the wire harness in fitting of a vehicle and a long fitting time.

SUMMARY

In view of existing or potential problems in the prior art, the present invention provides a quick fitting and protection mechanism for a wire harness in a slide rail, which is applicable to sliding seats to implement a connection between the wire harness and the sliding seat, ensure that the wire harness and the sliding seat move together, and achieve power supply and signal transmission of a long stroke, thus achieving a controllable wire harness direction and simple and convenient fitting.

The present invention adopts the following technical solutions to achieve the objectives. A quick fitting and protection mechanism for a wire harness in a slide rail is provided, where the slide rail has an upper slide rail and a lower slide rail that are slidable relative to each other, the lower slide rail has a slideway for the upper slide rail to slide in, and the mechanism includes:

a drag chain for the wire harness to be threaded through;

a drag chain towing support connected to the upper slide rail and slidable in the slideway of the lower slide rail with the upper slide rail, where the drag chain towing support has a drag chain port, a wire harness outlet, and a first channel affording communication between the drag chain port and the wire harness outlet, where one end of the drag chain is connected to the drag chain port; and a wire harness guide support having a wire harness entry, a wire harness exit, and a second channel affording communication between the wire harness entry and the wire harness exit, where the wire harness entry is in rotatable communication with the wire harness exit, and a rail fixing portion is disposed at the wire harness exit, where the rail fixing portion is detachably connected to the upper slide rail.

Beneficial effects of the present invention are as follows: The connected wire harness is threaded through the drag chain, and the drag chain is connected to the drag chain towing support and slides in the lower slide rail with movement of the upper slide rail through the drag chain towing support, so as to arrange the wire harness in the slide rail. The wire harness may be connected to the upper slide rail after passing through the drag chain towing support and the wire harness guide support, and the wire harness is threaded out of the drag chain is protected through the drag chain towing support and the wire harness guide support. The wire harness guide support is rotatably connected to the drag chain towing support, the rail fixing portion is disposed at the wire harness exit of the wire harness guide support, and the rail fixing part may be fixed to the upper slide rail by rotating the wire harness guide support, so as to quickly connect the wire harness to the upper slide rail. The wire harness passes through the drag chain towing support and the wire harness guide support, and a direction of the wire harness is controllable.

In some embodiments, a first sleeve is disposed at the wire harness outlet of the drag chain towing support, and a second sleeve is disposed at the wire harness entry of the wire harness guide support, where the second sleeve is insertable and rotatable in the first sleeve.

In some embodiments, the wire harness outlet is disposed on a top of the drag chain towing support, the first sleeve is disposed upward in a vertical direction, and the wire harness guide support is rotatable horizontally on the first sleeve through the second sleeve.

In some embodiments, a slot is provided in the upper slide rail, where the rail fixing portion is elastic and is inserted in and fixed to the slot.

In some embodiments, the slot is provided on a side of an upper half of the upper slide rail that is located on an upper side of the lower slide rail.

In some embodiments, the mechanism further includes a slide rail fitting member fitted and connected to the upper slide rail, where the drag chain towing support is fitted and connected to the slide rail fitting member.

In some embodiments, a first fitting groove and a second fitting groove are respectively provided on two opposite ends of the slide rail fitting member, where a bottom of one end of the upper slide rail is snap-fitted into the first fitting groove, and hook members fitted and connected to the second fitting groove are disposed on the drag chain towing support.

In some embodiments, the drag chain port and the hook members are respectively disposed on two opposite ends of the drag chain towing support, and drag chain connecting plates are disposed at the drag chain port, where an end of the drag chain is fixedly connected to the drag chain connecting plates.

In some embodiments, a wire harness channel for the wire harness to be threaded through is provided inside the drag chain, and one end of the wire harness is threaded out of the end of the drag chain and passes through the first channel and the second channel successively to be connected to the upper slide rail.

In some embodiments, a slide rail stop, where a vertical slot is provided at an end of the lower slide rail, the slide rail stop is inserted into the vertical slot, and a drag chain passage for the drag chain to shuttle through is reserved between a side portion of the slide rail stop and a side wall of the slideway.

BRIEF DESCRIPTION OF THE DRAWINGS

To describe the technical solutions in the embodiments of the present invention more clearly, the following briefly describes the accompanying drawings required for describ

DETAILED DESCRIPTION

The implementations of the invention are described below through specific examples. Those skilled in the art can easily understand the other advantages and effects of the present invention from the content disclosed in this specification. The present invention may also be implemented or applied through other different specific implementations. Various details in this specification may also be modified or changed based on different viewpoints and applications without departing from the spirit of the present invention.

The following further describes the present invention in detail with reference to the accompanying drawings and specific embodiments.

Figure 1:
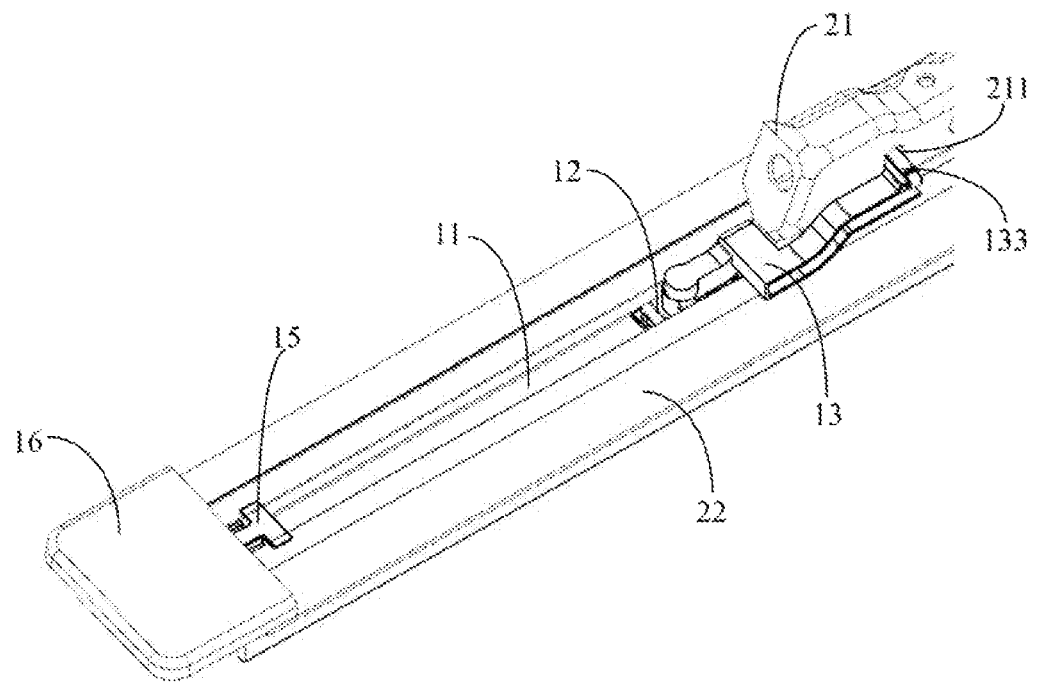
- FIG. 1 is an overall schematic structural diagram of a quick fitting and protection mechanism for a wire harness in a slide rail according to an embodiment of the present invention.
Figure 2:
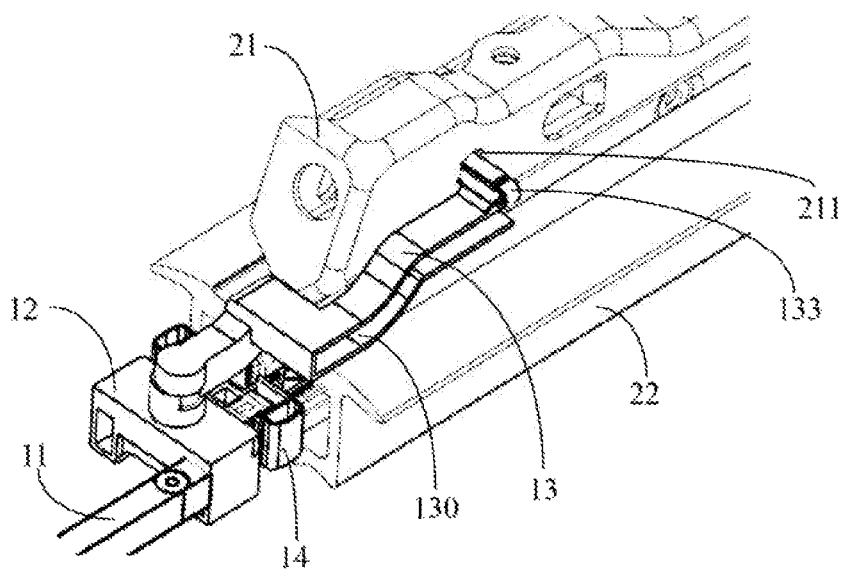
FIG. 2 is a partial schematic enlarged structural diagram of a main part of the quick fitting and protection mechanism for a wire harness in a slide rail according to an embodiment of the present invention.
Figure 3:
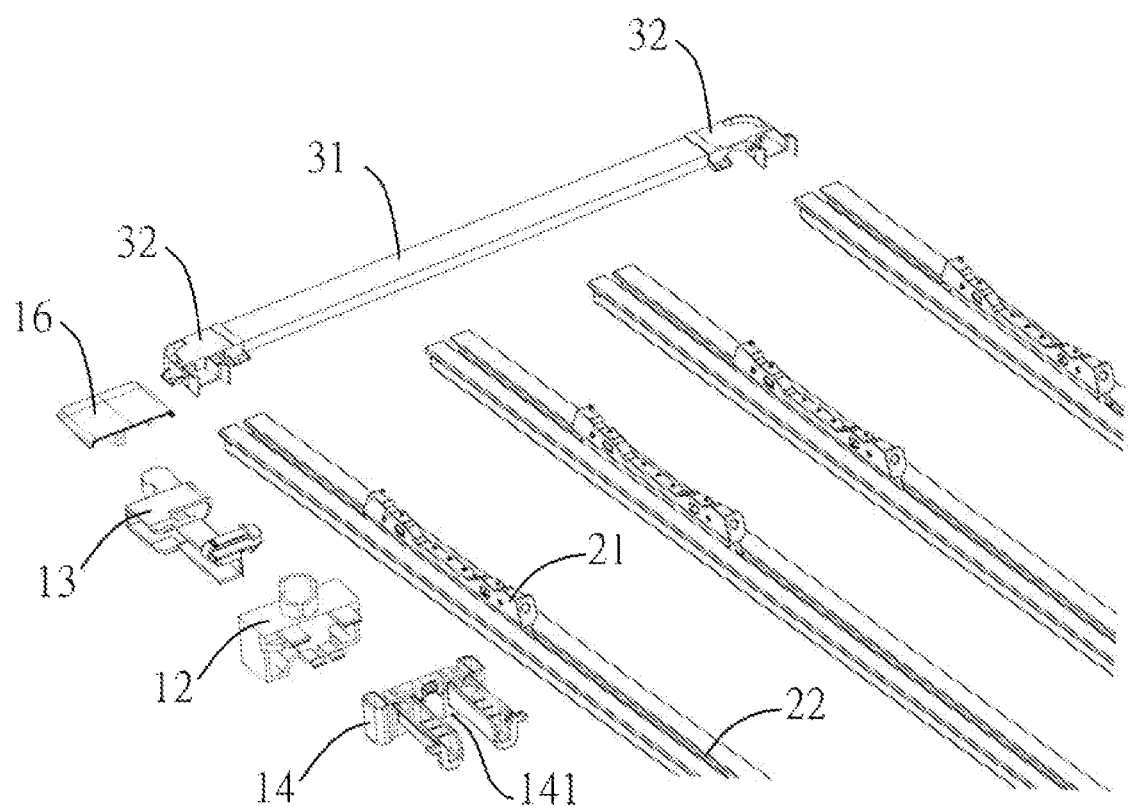
FIG. 3 is an exploded schematic structural diagram of the quick fitting and protection mechanism a wire harness in a slide rail according to an embodiment of the present invention.
Figure 4:
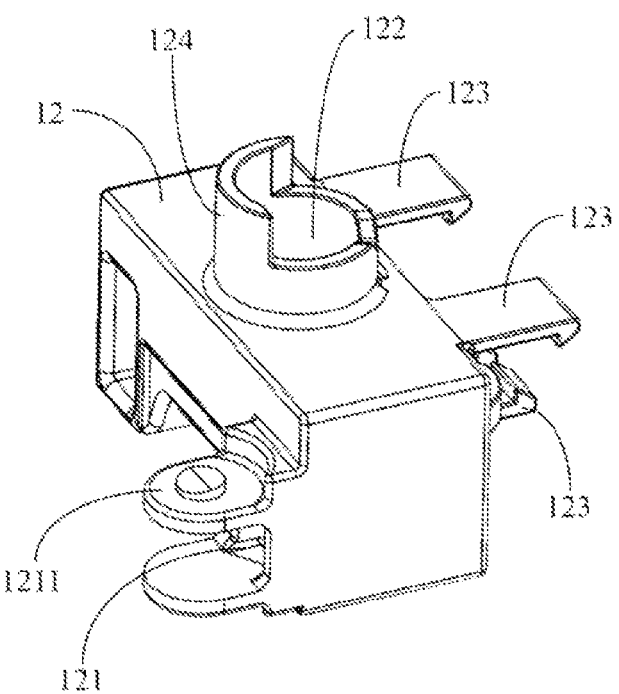
FIG. 4 is a schematic structural diagram of a drag chain towing support according to an embodiment of the present invention.
Figure 5:
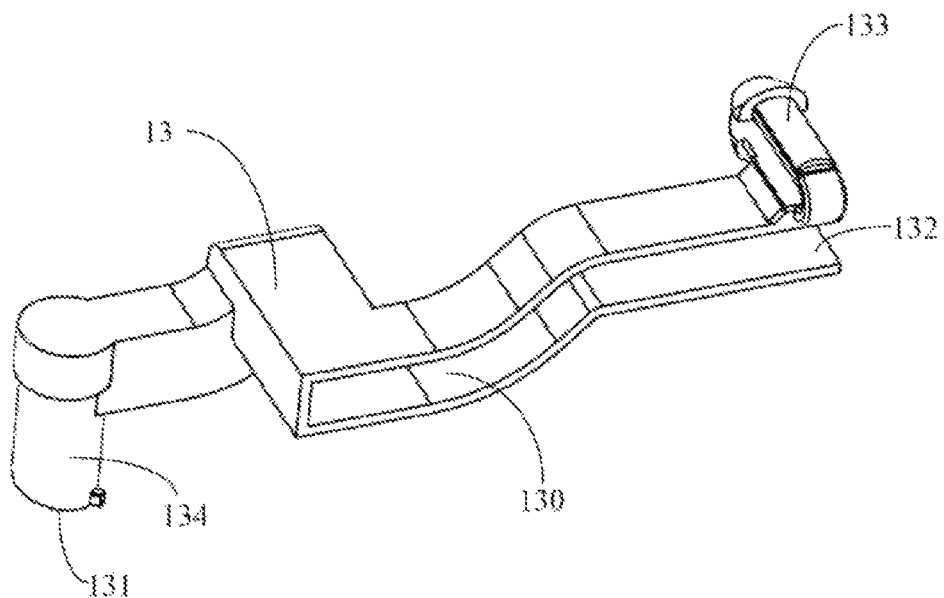
FIG. 5 is a schematic structural diagram of a wire harness guide support according to an embodiment of the present invention.
Figure 6:
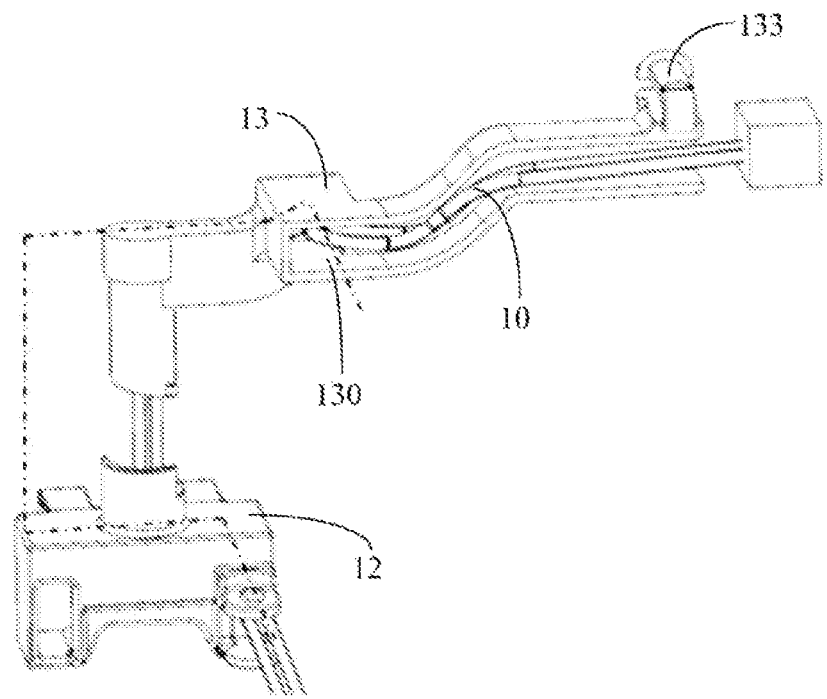
FIG. 6 is a schematic diagram of a wire harness direction according to an embodiment of the present invention.
Figure 7:
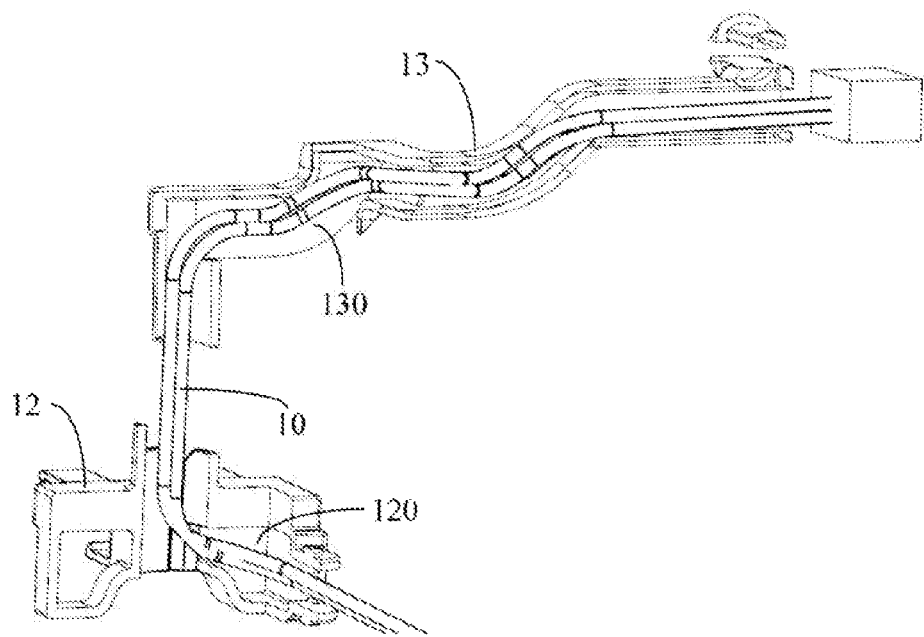
FIG. 7 is a schematic cross-sectional view of the wire harness direction according to an embodiment of the present invention.

Referring to FIG. 1 to FIG. 7, FIG. 1 illustrates an overall schematic structural diagram of a quick fitting and protection mechanism for a wire harness in a slide rail according to an embodiment of the present invention, FIG. 2 illustrates a partial schematic enlarged structural diagram of a main part of the quick fitting and protection mechanism for a wire harness in a slide rail according to an embodiment of the present invention, FIG. 3 illustrates an exploded schematic structural diagram of the quick fitting and protection mechanism for a wire harness in a slide rail according to an embodiment of the present invention, FIG. 4 illustrates a schematic structural diagram of a drag chain towing support according to an embodiment of the present invention, FIG. 5 illustrates a schematic structural diagram of a wire harness guide support according to an embodiment of the present invention, FIG. 6 illustrates a schematic diagram of a wire harness direction according to an embodiment of the present invention, and FIG. 7 illustrates a schematic cross-sectional view of the wire harness direction according to an embodiment of the present invention.

As shown in FIG. 1 to FIG. 3, a slide rail has an upper slide rail 21 and a lower slide rail 22 that are slidable relative to each other. The lower slide rail 22 has a slideway for the upper slide rail 21 to slide in. The quick fitting and protection mechanism for a wire harness in a slide rail mainly includes three parts: a drag chain 11 for a wire harness to be threaded through, a drag chain towing support 12, and a wire harness guide support 13. A wire harness channel for the wire harness to be threaded through is provided inside the drag chain 11. The wire harness is threaded through the drag chain 11 to form a drag chain wire harness. As shown in FIG. 4, FIG. 6, and FIG. 7, the drag chain towing support 12 is connected to the upper slide rail 21 and slides in the slideway of the lower slide rail 22 with the upper slide rail 21. The drag chain towing support 12 has a drag chain port 121 and a wire harness outlet 122, and the drag chain towing support 12 has a first channel 120 with two ends in communication with the drag chain port 121 and the wire harness outlet 122 therein, and one end of the drag chain 11 is fixedly connected to the drag chain port 121. Preferably, the drag chain port 121 is a square port that matches the drag chain 11 in both shape and size, drag chain connecting plates 1211 are respectively disposed at an upper edge and a lower edge of the square port, and the end of the drag chain 11 is inserted between the two drag chain connecting plates 1211 and may be fixed to the drag chain connecting plates through bolts. The wire harness channel in the drag chain 11 is in communication with the first channel 120 inside the drag chain towing support 12 through the square port.

As shown in FIG. 5, FIG. 6, FIG. 7, and FIG. 10, FIG. 10 illustrates a schematic diagram of a fitting process of the wire harness guide support and the upper slide rail according to an embodiment of the present invention. As shown in the figure, the wire harness guide support 13 has a wire harness entry 131 and a wire harness exit 132, and the wire harness guide support 13 has a second channel 130 with two ends in communication with the wire harness entry 131 and the wire harness exit 132 therein. The wire harness entry 131 is rotatably connected to the wire harness outlet 122 of the drag chain towing support 12. A rail fixing portion 133 is disposed at the wire harness exit 132. The rail fixing portion 133 is detachably connected to the upper slide rail 21. Preferably, a slot 211 is provided in the upper slide rail 21. The rail fixing portion 133 is elastic and is inserted into the slot 211. In this way, the fitted connection between the wire harness entry 131 and the upper slide rail 21 is completed. The slot 211 is provided on a side of an upper half of the upper slide rail 21 that is located on an upper side of the lower slide rail 22, as shown in FIG. 2.

As shown in FIG. 5, the rail fixing portion 133 on the wire harness entry 131 may be a U-shaped metal sheet, and protrusions are disposed on an outer edge of an opened end of the U-shaped metal sheet. The U-shaped metal sheet is elastic due to the metal characteristics (other materials with elastic characteristics may also be used to replace the metal, and a shape of the metal sheet is not limited to the U shape, provided that one end is closed and one end is opened and the metal sheet is elastic). The U-shaped metal sheet is horizontally placed, and a bottom side is fixed to an upper part of the wire harness exit 132 of the wire harness guide support 13. The U-shaped metal sheet can be aligned to the slot 211 on the upper slide rail 21 when the wire harness guide support 13 is rotated to a proper position. The opened end of the U-shaped metal sheet is inserted into the slot 211, and a mouth of the slot 211 is slightly smaller than a width of the opened end of the U-shaped metal sheet. After being inserted into the slot 211, the U-shaped metal sheet can press against an inner wall of the slot 211 under an elastic action, so as to complete fixing of the rail fixing portion 133 and the upper slide rail 21. When the fixing needs to be released, only the U-shaped metal sheet needs to be pulled out with a large force.

As shown in FIG. 6 and FIG. 7, one end of the wire harness 10 may pass through the first channel 120 in the drag chain towing support 12 and the second channel 130 in the wire harness guide support 13 successively after being threaded out of the end of the drag chain 11 to be connected to the upper slide rail 21, thereby connecting the wire harness 10 and the upper slide rail.

In the quick fitting and protection mechanism for a wire harness in a slide rail of the present invention, the connected wire harness 10 is threaded through the drag chain 11, and the drag chain 11 is connected to the drag chain towing support 12 and slides in the lower slide rail 22 with movement of the upper slide rail 21 through the drag chain towing support 12, so as to arrange the wire harness 10 in the slide rail. The wire harness 10 may be connected to the upper slide rail 21 after passing through the drag chain towing support 12 and the wire harness guide support 13, and the wire harness 10 threaded out of the drag chain 11 is protected through the drag chain towing support 12 and the wire harness guide support 13. The wire harness guide support 13 is rotatably connected to the drag chain towing support 12, the rail fixing portion 133 is disposed at the wire harness exit 132 of the wire harness guide support 13, and the rail fixing part 133 may be fixed to the upper slide rail 21 by rotating the wire harness guide support 13, so as to quickly connect the wire harness 10 to the upper slide rail 21 (an electrical connector dedicated for connecting the wire harness or a through hole for the wire harness to be connected to the seat after passing through the through hole is provided in the upper slide rail). The wire harness 10 passes through the drag chain towing support 12 and the wire harness guide support 13, and a direction of the wire harness is controllable.

Preferably, as shown in FIG. 3, the drag chain may be bent and then accommodated in a wire harness accommodation box 31, a drag chain adapter 32 is disposed at an end of the wire harness accommodation box 31, and a drag chain channel in communication with inside of the wire harness accommodation box and the slideway of the lower slide rail 22 is formed inside the drag chain adapter 32. The drag chain may be shuttled between the wire harness accommodation box 31 and the lower slide rail 22 through the drag chain adapter 32. One end of the drag chain is fixedly connected to the wire harness accommodation box 31 or the drag chain adapter 32, and the other end of the drag chain is threaded out of the drag chain adapter 32 into the slideway of the lower slide rail 22 to be connected to the drag chain port of drag chain towing support 12. In this way, the movement of the upper slide rail 21 can drive the drag chain towing support 12 and the drag chain to move along the slideway of the lower slide rail, so as to satisfy a need to arrange a wire harness of a long-stroke slide rail.

Further, with reference to FIG. 4 to FIG. 7, a first sleeve 124 is disposed at the wire harness outlet 122 of the drag chain towing support 12, a second sleeve 134 is disposed at the wire harness entry 131 of the wire harness guide support 13, and the second sleeve 134 is insertable and rotatable in the first sleeve 124, so as to achieve rotation between the wire harness guide support 13 and the drag chain towing support 12. Further, A rotation direction and a rotation range of the wire harness guide support 13 may be restricted by arranging features such as a notch and a bump between the first sleeve 124 and the second sleeve 134.

A width and a height of the drag chain towing support 12 match a width and a height of the slideway in the lower slide rail 22, the sliding between the drag chain towing support 12 and the lower slide rail 22 can be more stable, and the sliding of the wire harness on the lower slide rail is also more stable, leading to a desirable towing effect. The wire harness outlet 122 on the drag chain towing support 12 is disposed on a top of the drag chain towing support, the first sleeve 124 on the wire harness outlet 122 is disposed upward in a vertical direction, and the wire harness guide support 13 is rotatable horizontally on the first sleeve through the second sleeve 134 on the wire harness entry 131 of the wire harness guide support.

Figure 8:
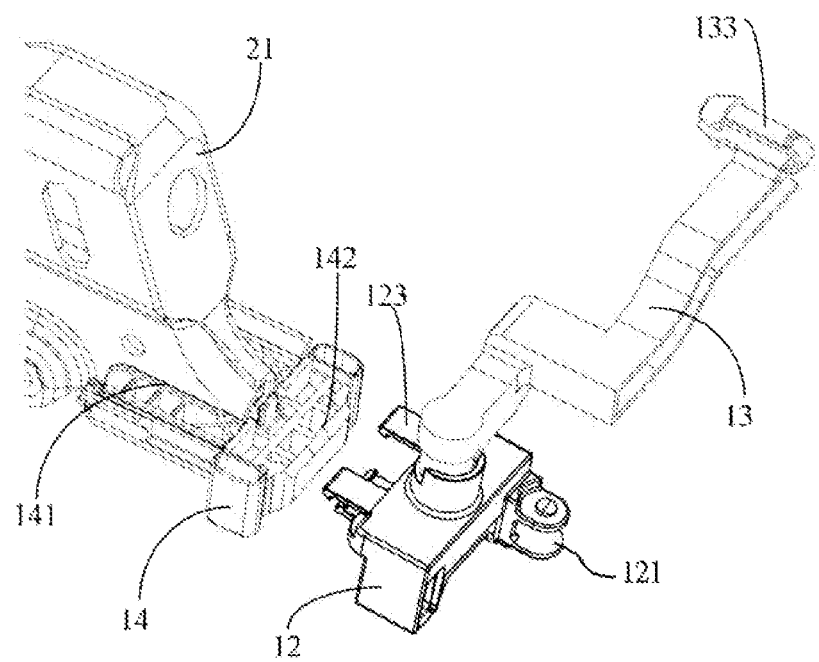
FIG. 8 is a schematic structural diagram of a slide rail fitting member and a drag chain towing support before fitting according to an embodiment of the present invention.
Figure 9:
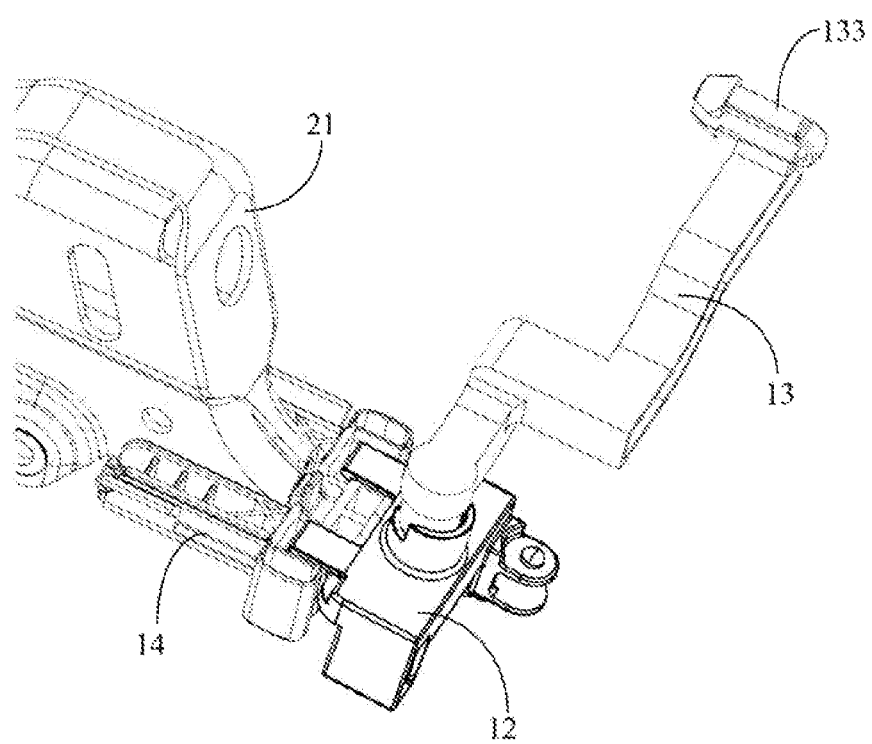
FIG. 9 is a schematic structural diagram of the slide rail fitting member and the drag chain towing support after fitting according to an embodiment of the present invention.
Figure 10:
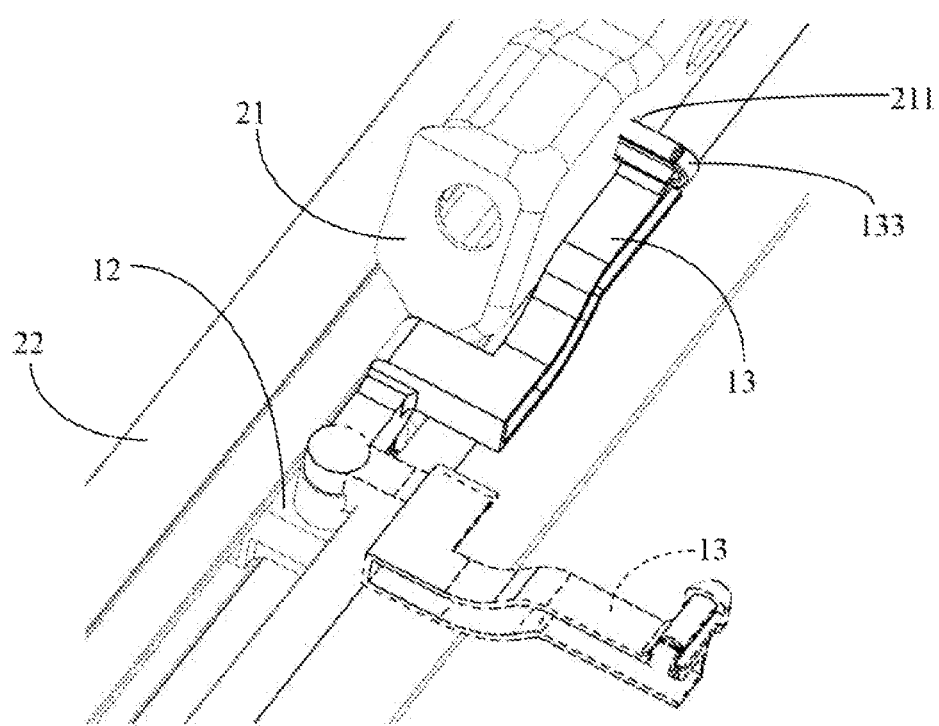
FIG. 10 is a schematic diagram of a fitting process of the wire harness guide support and the upper slide rail according to an embodiment of the present invention.

With reference to FIG. 8 and FIG. 9, FIG. 8 illustrates a schematic structural diagram of a slide rail fitting member and a drag chain towing support before fitting according to an embodiment of the present invention, and FIG. 9 illustrates a schematic structural diagram of the slide rail fitting member and the drag chain towing support after fitting according to an embodiment of the present invention. As shown in the figure, the drag chain port 121 on the drag chain towing support 12 is located on a side of the drag chain towing support away from the upper slide rail 21, hook members 123 are respectively disposed on a top and a bottom on a side of the drag chain towing support 12 facing the upper slide rail 21. A slide rail fitting member 14 is further fitted and connected to a bottom of the upper slide rail 21, and the drag chain towing support 12 is further fitted and connected to the slide rail fitting member 14. A bottom of the slide rail fitting member 14 is attached to a bottom surface of the slideway of the lower slide rail 22, the slide rail fitting member 14 may slide along the lower slide rail 22 along with the upper slide rail 21, and two sides of the slide rail fitting member 14 are attached to a side surface of the lower slide rail 22. A first fitting groove 141 and a second fitting groove 142 are respectively provided on two opposite ends of the slide rail fitting member 14. A bottom of one end of the upper slide rail 21 is snap-fitted into the first fitting groove 141, and the hook members 123 on the drag chain towing support 12 are hooked to the second fitting groove 142, so that the drag chain towing support 12, the slide rail fitting member 14, and the upper slide rail 21 are connected to form a sliding assembly.

Figure 11:
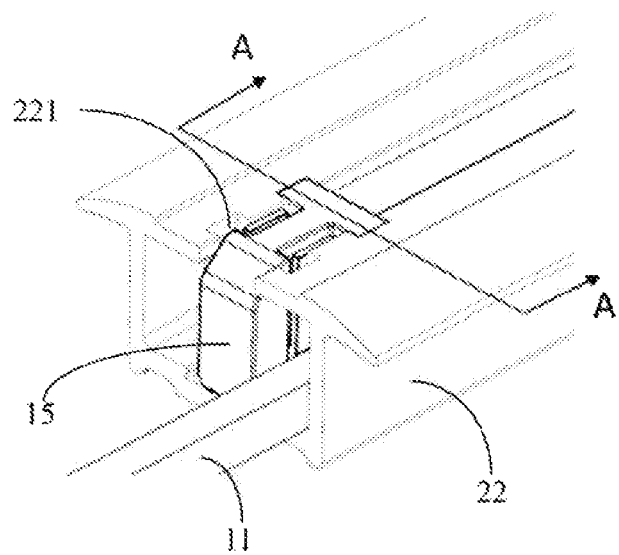
FIG. 11 is a schematic diagram of a fitted structure of a slide rail stop and a lower slide rail according to an embodiment of the present invention.
Figure 12:
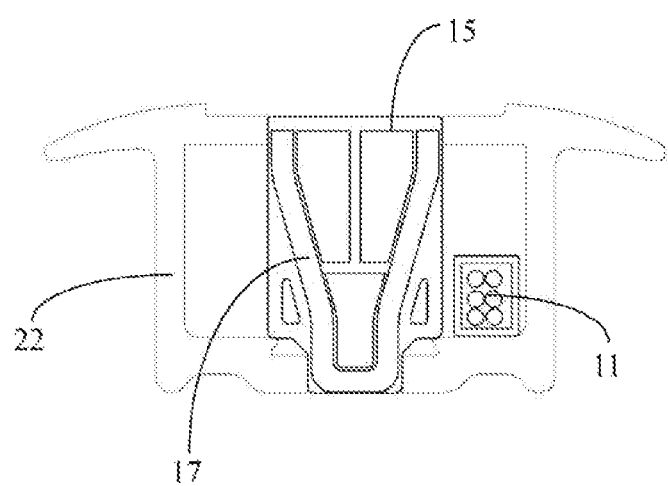
FIG. 12 is a schematic cross-sectional view at A-A according to an embodiment of FIG. 11.
Figure 13:
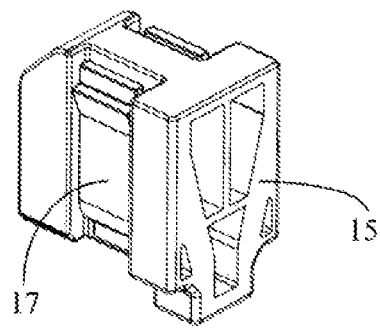
FIG. 13 is a schematic structural diagram of the slide rail stop according to an embodiment of the present invention.
Figure 14:
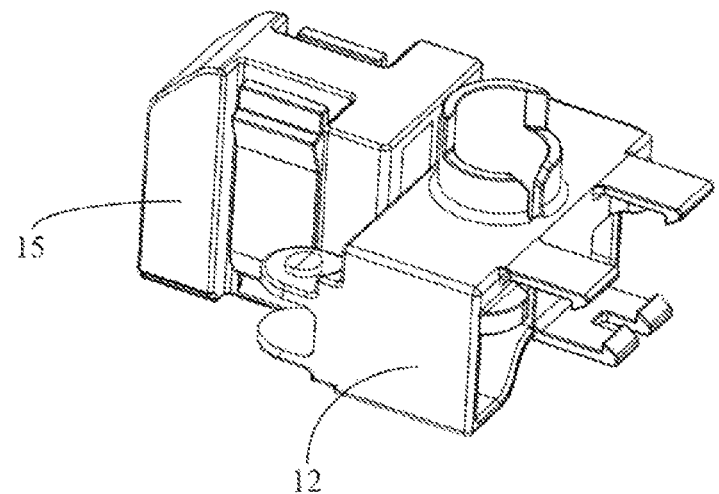
FIG. 14 is a schematic diagram of the slide rail stop and the drag chain towing support being in contact with each other according to an embodiment of the present invention.

With reference to FIG. 11 and FIG. 14, FIG. 11 illustrates a schematic diagram of a fitted structure of a slide rail stop and a lower slide rail according to an embodiment of the present invention, FIG. 12 illustrates a schematic cross-sectional view at A-A according to an embodiment of FIG. 11, FIG. 13 illustrates a schematic structural diagram of the slide rail stop according to an embodiment of the present invention, and FIG. 14 illustrates a schematic diagram of the slide rail stop and the drag chain towing support being in contact with each other according to an embodiment of the present invention. As shown in the figure, a slide rail stop 15 may be further disposed at the end of the lower slide rail 22 to serve as a stroke stop point of the upper slide rail 21, that is, to limit a sliding range of the upper slide rail 21 and prevent the upper slide rail from sliding out of the lower slide rail 22. A position of the slide rail stop 15 may be set according to actual requirements, and is not limited to the end position. A vertical slot 221 is provided in the lower slide rail 22. A shape and a size of the vertical slot 221 match those of the slide rail stop 15 for inserting and mounting the slide rail stop 15. After the slide rail stop 15 is inserted into the vertical slot 221, a drag chain passage for the drag chain 11 to shuttle through is reserved between the slide rail stop and the side wall of slideway of the lower slide rail 22 to ensure that the drag chain 11 can be fitted smoothly and travel smoothly.

Preferably, as shown in FIG. 14, an insert structure is disposed in each of the drag chain towing support 12 and the slide rail stop 15, and the insert structures each may adopt a metal insert. When the upper slide rail slides to a foremost position, the drag chain towing support 12 can be protected from being impacted by the insert structure, thereby protecting the wire harness therein from being damaged. The metal insert in the drag chain towing support 12 may be disposed at a top position on the drag chain towing support. The metal insert 17 in the slide rail stop 15 is V-shaped and is disposed in the middle of the slide rail stop 15, as shown in FIG. 12 to FIG. 14.

Figure 15:
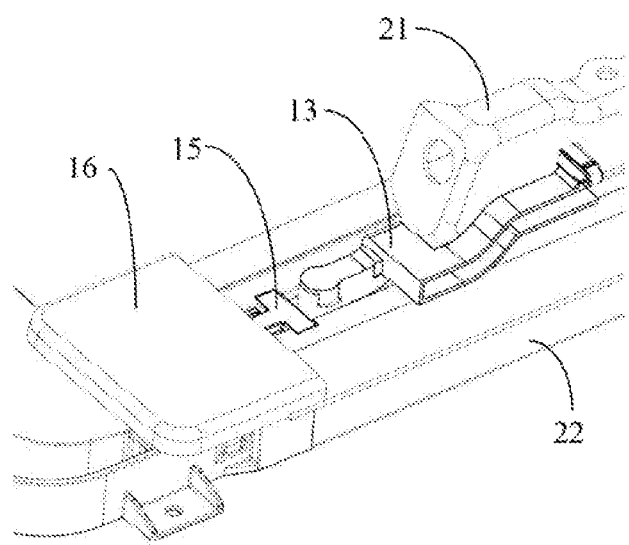
FIG. 15 is a schematic diagram of a fitted structure of a slide rail end cover and the lower slide rail according to an embodiment of the present invention.

Referring to FIG. 15 again, a slide rail end cover 16 is further disposed at the end of the lower slide rail 22. The slide rail end cover 16 is disposed above the slide rail stop 15 and is attached to a top plane of the lower slide rail 22, which can beautify the appearance and play a limiting role in combination with the slide rail stop 15. The slide rail end cover 16 may be further connected to an upper part of the drag chain adapter 32 mentioned above to further strengthen the connection between the drag chain adapter 32 and the lower slide rail 22.

Figure 16:
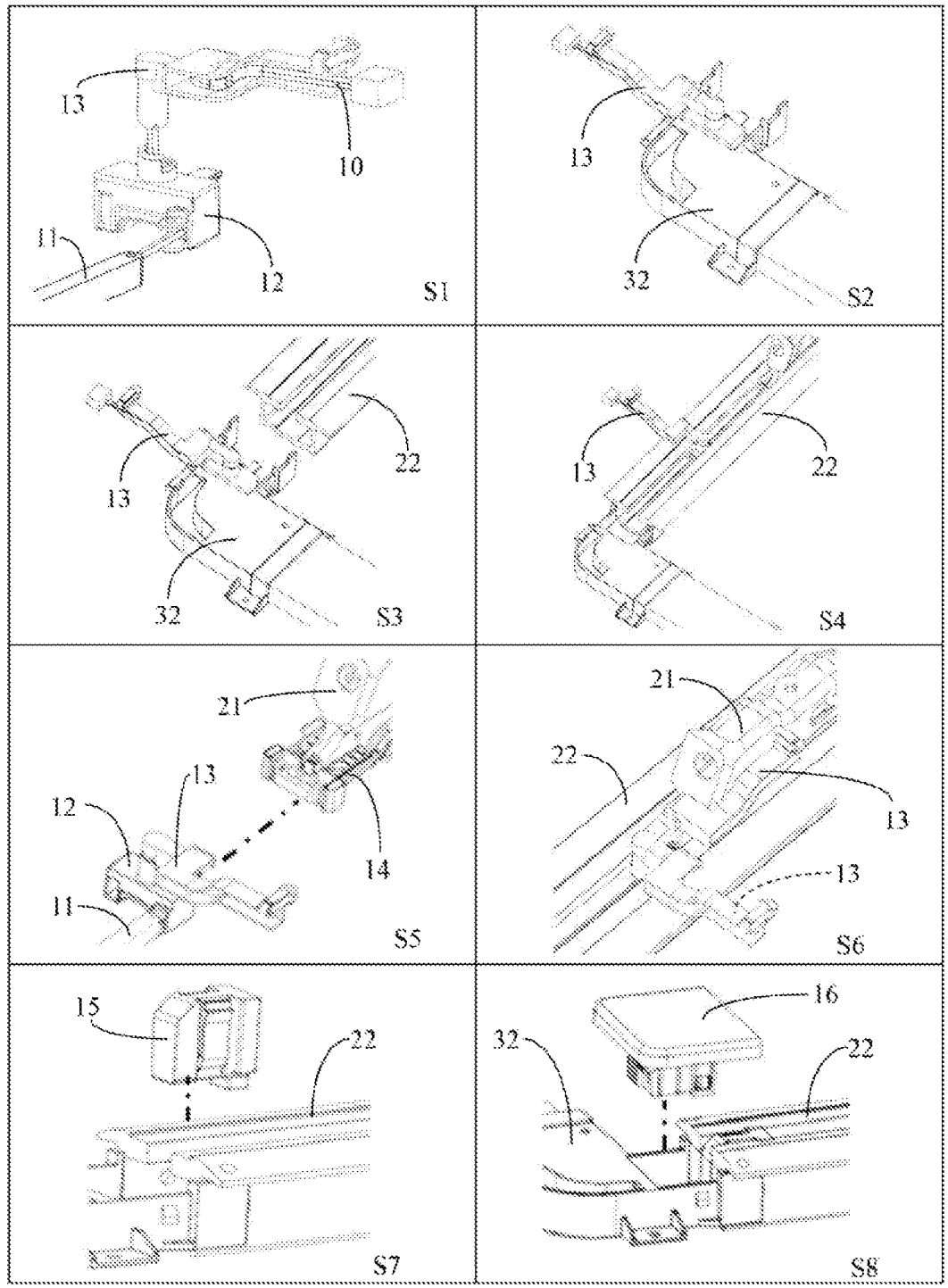
FIG. 16 is a schematic diagram of a fitting process of the quick fitting and protection mechanism for a wire harness in a slide rail according to an embodiment of the present invention.

With reference to FIG. 16, FIG. 16 illustrates a schematic diagram of a fitting process of the quick fitting and protection mechanism for a wire harness in a slide rail according to an embodiment of the present invention. As shown in the figure, the slide rail in this embodiment is a slide rail at a bottom of a vehicle seat, the upper slide rail is fixed at the bottom of the seat, and the wire harness needs to pass through the long-stroke slide rail in the wire harness accommodation box to be connected to the upper slide rail. Fitting steps of the long-stroke slide include the following:

Step S1: Connect an end of the drag chain 11 in the wire harness accommodation box that is connected to the seat to the drag chain port of the drag chain towing support 12, and pass the wire harness in the drag chain 11 through the channels in the drag chain towing support and the wire harness guide support 13.

Step S2: After the drag chain towing support 12 and the wire harness guide support 13 are fitted, skip connecting the wire harness 10 at the wire harness exit of the wire harness outlet support 13 to a wire harness connector, and accommodate the other end of the wire harness 10 in the wire harness accommodation box and connect the other end to a power supply body (such as a vehicle main control system or an external power source) to form a power supply assembly.

Step S3: Connect the drag chain adapter 32 at the end of the wire harness accommodation box to the lower slide rail 22.

Step S4: Introduce the drag chain into the slideway of the lower slide rail 22 by using the drag chain towing support 12 and the wire harness guide support 13.

Step S5: Connect the drag chain towing support 12 to the slide rail fitting member 14 at the bottom of the upper slide rail 21.

Step S6: Rotate the wire harness guide support 13 by about 90 degrees to be connected to the upper slide rail 21.

Step S7: Mount the slide rail stop 15 to the end of the lower slide rail 22.

Step S8: Mount the slide rail end cover 16 to the end of the lower slide rail 22.

It should be noted that the structures, proportions, sizes, and the like shown in the drawings of the specification, in coordination with the content disclosed in the specification, are only used to help a person skilled in the art to read and understand, and they are not intended to limit the conditions under which the present invention can be implemented and therefore have no technical significance. Any modifications to the structure, changes to the proportional relationship or the adjustment on the size should fall within the scope of the technical content disclosed by the present invention without affecting the effects and the objectives that can be achieved by the present invention. In addition, the terms such as "upper", "lower', "left", "right", "middle", and "a" mentioned in this specification are also merely for facilitating clear descriptions, but are not intended to limit the scope of implementation of the present invention. Without substantially changing the technical contents, changes or adjustments of relative relationships thereof should also fall within the scope of implementation of the present invention.

The foregoing descriptions are merely preferred embodiments of the present invention, and are not intended to limit the present invention in any form. Although the present invention has been disclosed above through the preferred embodiments, the embodiments are not intended to limit the present invention. A person skilled in the art can make some equivalent variations, alterations or modifications to the above-disclosed technical content without departing from the scope of the technical solutions of this application to obtain equivalent embodiments. Any simple alteration, equivalent change or modification made to the above embodiments according to the technical essence of the present invention without departing from the content of the technical solutions of this application shall fall within the scope of the technical solutions of the present invention.

What is claimed is:

1. A quick fitting and protection mechanism for a wire harness in a slide rail, wherein the slide rail has an upper slide rail and a lower slide rail that are slidable relative to each other, the lower slide rail has a slideway for the upper slide rail to slide in, and the mechanism comprises:
   a drag chain for the wire harness to be threaded through;
   a drag chain towing support connected to the upper slide rail and slidable in the slideway of the lower slide rail with the upper slide rail, wherein the drag chain towing support has a drag chain port, a wire harness outlet, and a first channel affording communication between the drag chain port and the wire harness outlet, wherein one end of the drag chain is connected to the drag chain port; and a wire harness guide support having a wire harness entry, a wire harness exit, and a second channel affording communication between the wire harness entry and the wire harness exit, wherein the wire harness entry is in rotatable communication with the wire harness exit, and a rail fixing portion is disposed at the wire harness exit, wherein the rail fixing portion is detachably connected to the upper slide rail.

2. The quick fitting and protection mechanism for a wire harness in a slide rail according to claim 1, wherein a first sleeve is disposed at the wire harness outlet of the drag chain towing support, and a second sleeve is disposed at the wire harness entry of the wire harness guide support, wherein the second sleeve is insertable and rotatable in the first sleeve.

3. The quick fitting and protection mechanism for a wire harness in a slide rail according to claim 2, wherein the wire harness outlet is disposed on a top of the drag chain towing support, the first sleeve is disposed upward in a vertical direction, and the wire harness guide support is rotatable horizontally on the first sleeve through the second sleeve.

4. The quick fitting and protection mechanism for a wire harness in a slide rail according to claim 1, wherein a slot is provided in the upper slide rail, wherein the rail fixing portion is elastic and is inserted in and fixed to the slot.

5. The quick fitting and protection mechanism for a wire harness in a slide rail according to claim 4, wherein the slot is provided on a side of an upper half of the upper slide rail that is located on an upper side of the lower slide rail.

6. The quick fitting and protection mechanism for a wire harness in a slide rail according to claim 1, wherein a slide rail fitting member fitted and connected to the upper slide rail, wherein the drag chain towing support is fitted and connected to the slide rail fitting member.

7. The quick fitting and protection mechanism for a wire harness in a slide rail according to claim 6, wherein a first fitting groove and a second fitting groove are respectively provided on two opposite ends of the slide rail fitting member, wherein a bottom of one end of the upper slide rail is snap-fitted into the first fitting groove, and hook members fitted and connected to the second fitting groove are disposed on the drag chain towing support.

8. The quick fitting and protection mechanism for a wire harness in a slide rail according to claim 7, wherein the drag chain port and the hook members are respectively disposed on two opposite ends of the drag chain towing support, and drag chain connecting plates are disposed at the drag chain port, wherein an end of the drag chain is fixedly connected to the drag chain connecting plates.

9. The quick fitting and protection mechanism for a wire harness in a slide rail according to claim 1, wherein a wire harness channel for the wire harness to be threaded through is provided inside the drag chain, and one end of the wire harness is threaded out of an end of the drag chain and passes through the first channel and the second channel successively to be connected to the upper slide rail.

10. The quick fitting and protection mechanism for a wire harness in a slide rail according to claim 1, wherein a slide rail stop, wherein a vertical slot is provided at an end of the lower slide rail, the slide rail stop is inserted into the vertical slot, and a drag chain passage for the drag chain to shuttle through is reserved between a side portion of the slide rail stop and a side wall of the slideway.

* * * * *